Feb. 19, 1929. 1,703,076
H. KRAUSS
FEEDING DEVICE FOR CIRCULAR MILLING MACHINES
Filed Feb. 24, 1928
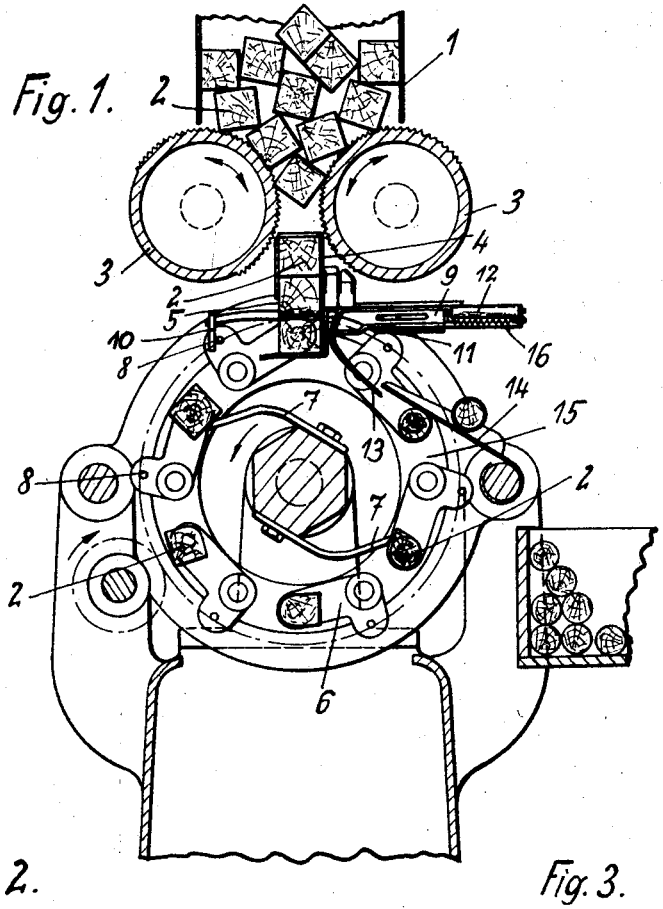
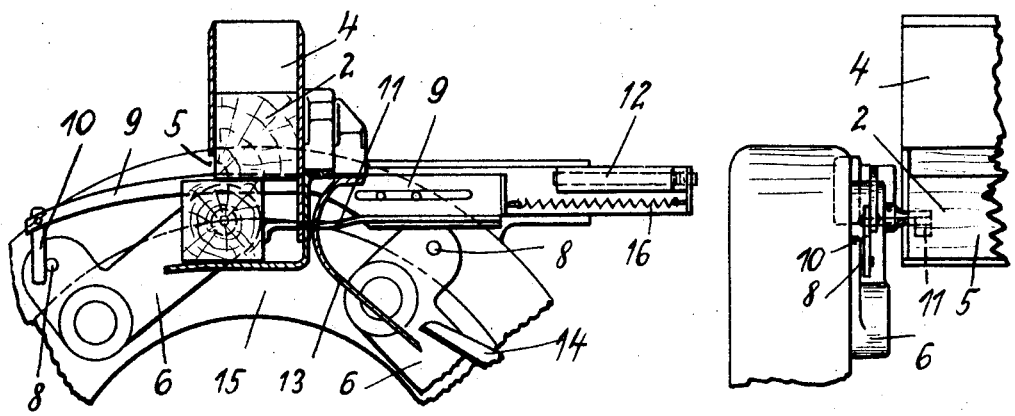

Patented Feb. 19, 1929.

1,703,076

UNITED STATES PATENT OFFICE.

HERBERT KRAUSS, OF CHEMNITZ, GERMANY.

FEEDING DEVICE FOR CIRCULAR MILLING MACHINES.

Application filed February 24, 1928. Serial No. 256,782.

This invention relates to a feeding device for circular milling machines in which the wood-blocks, fed from a charging hopper by means of two continuously oscillating toothed drums, are piled up in a guide. This guide has an opening in the side turned in the direction in which the clamping drum rotates, the wood-blocks being pushed at uniform intervals through this opening towards the clamping jaws. The clamping jaws, oscillatably mounted on the clamping drum, release automatically the ejecting device and grip between their points the wood block in such a manner that it can be finished during one rotation of the drum. The fashioned round work drops onto an inclined plane and rolls over an oscillatable bridge.

An embodiment of the invention is illustrated, by way of example, in the accompanying drawing, in which:

Fig. 1 is a sectional side-elevation of the improved circular milling machine.

Fig. 2 shows in side-elevation partly in section the ejecting device in the pushing position.

Fig. 3 is a front-elevation of Fig. 2.

The wooden blocks 2 are fed from a charging hopper 1 and are piled up in a guide 4 by feeding cylinders 3 which continuously oscillate to and fro. The guide 4 has an opening in the side turned in the same direction in which the clamping drum 15 rotates. Through this opening the wooden blocks 2 are successively ejected at uniform intervals and fed to the clamping jaws 6. Each clamping jaw 6, mounted on the clamping drum 15, grips the block 2 between its points so that the block can be fashioned by the cutters 7 during one rotation of drum 15, whereupon the block is liberated and delivered.

The pushing or ejecting device is operated by the clamping jaws 6 which have each a catch bolt 8 designed to act upon an abutment 10 at the end of a slide 9. The pusher 11 fixed to the slide 9 is thus pulled forward and ejects the corresponding block 2 through the opening in the guide 4 (Fig. 2). A spring 16 serves for returning the slide 9 into the initial position as soon as its abutment 10 has been released by the catch 8. A shock-absorber 12 serves to soften the striking of the pusher against the blocks. One ejecting device is arranged at either side of the guide 4.

The fashioned blocks come, at the end of their travel, onto a guide-plate 13. The ascending block raises a bridge 14 and is released by the withdrawal of the clamping jaws 6 so that it rolls down over this bridge 14 (Fig. 1).

Owing to the positively controlled pushing devices it is possible to increase the revolving-speed of the clamping drum 15 so that the efficiency of the machine is increased.

I claim:—

A feeding device for circular milling machines comprising in combrising in combination with a rotary clamping drum, clamping jaws on said drum, a charging hopper and feeding cylinders under said hopper, a vertical guide in which the wooden blocks are piled by said feeding drums, said guide having an opening in its wall turned in the direction of rotation of said clamping drum, a pusher-device at each side of said guide consisting of a spring-controlled slide, an abutment at the front end of each slide, a pusher fixed to said slide adapted to push the lowermost block out of said guide, a catch-bolt on each pair of clamping jaws adapted to strike against said abutments of said slide to pull said slide forward against the action of its spring, and an inclined guide-plate for delivering the fashioned block at the end of its travel.

In testimony whereof I affix my signature.

HERBERT KRAUSS.